(12) United States Patent
Yong et al.

(10) Patent No.: US 7,682,740 B2
(45) Date of Patent: Mar. 23, 2010

(54) ORGANIC/INORGANIC COMPOSITE POROUS LAYER-COATED ELECTRODE AND ELECTROCHEMICAL DEVICE COMPRISING THE SAME

(75) Inventors: Hyun Hang Yong, Seoul (KR); Sang Young Lee, Daejeon (KR); Seok Koo Kim, Daejeon (KR); Soon Ho Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1156 days.

(21) Appl. No.: 11/051,610

(22) Filed: Feb. 4, 2005

(65) Prior Publication Data

US 2005/0266150 A1  Dec. 1, 2005

(30) Foreign Application Priority Data

Feb. 7, 2004 (KR) .................. 10-2004-0008136
Feb. 10, 2004 (KR) .................. 10-2004-0008585

(51) Int. Cl.
H01M 4/62 (2006.01)
H01M 4/02 (2006.01)
H01M 2/16 (2006.01)

(52) U.S. Cl. ............... 429/217; 429/209; 429/251; 429/247; 429/249

(58) Field of Classification Search ............. 429/217, 429/209, 251, 247, 249
See application file for complete search history.

(56) References Cited

U.S. PATENT DOCUMENTS

| | | | | |
|---|---|---|---|---|
| 4,540,640 | A * | 9/1985 | Iacovangelo et al. | 429/41 |
| 5,654,114 | A * | 8/1997 | Kubota et al. | 429/338 |
| 5,882,721 | A | 3/1999 | Delnick | |
| 6,261,721 | B1 | 7/2001 | Andrieu et al. | |
| 6,270,928 | B1 * | 8/2001 | Andrieu et al. | 429/249 |
| 6,277,514 | B1 * | 8/2001 | Ying et al. | 429/129 |

(Continued)

FOREIGN PATENT DOCUMENTS

CN  1259773 A  7/2000

(Continued)

OTHER PUBLICATIONS

Imanishi et al., "Four volts class solid lithium polymer batteries with a composite polymer electrolyte," Journal of Power Sources, vol. 110 (2002) pp. 38-45.

(Continued)

*Primary Examiner*—Patrick Ryan
*Assistant Examiner*—Helen O Conley
(74) *Attorney, Agent, or Firm*—Birch, Stewart, Kolasch & Birch, LLP

(57) ABSTRACT

Disclosed is an electrode comprising a first organic/inorganic composite porous coating layer formed on its surface, wherein the first coating layer includes inorganic particles and a binder polymer for interconnecting and fixing the inorganic particles, and has micropores formed by interstitial volumes among the inorganic particles. An electrochemical device including the same electrode is also disclosed. Further, disclosed is a method for manufacturing an electrode having an organic/inorganic composite porous coating layer on the surface thereof, comprising the steps of: (a) coating a current collector with slurry containing an electrode active material and drying it to provide an electrode; and (b) coating the surface of electrode obtained from step (a) with a mixture of inorganic particles with a binder polymer. A lithium secondary battery including the electrode shows improved safety and minimized degradation in battery performance.

29 Claims, 6 Drawing Sheets

U.S. PATENT DOCUMENTS

| | | |
|---|---|---|
| 6,299,653 B1 | 10/2001 | Hoshi et al. |
| 6,328,770 B1 | 12/2001 | Gozdz |
| 6,387,564 B1 | 5/2002 | Yamashita et al. |
| 6,432,586 B1 | 8/2002 | Zhang ................... 429/251 |
| 6,544,689 B1 | 4/2003 | Riley et al. ............. 429/302 |
| 6,676,713 B1 | 1/2004 | Okada et al. |

FOREIGN PATENT DOCUMENTS

| | | |
|---|---|---|
| JP | 05-314995 | 11/1993 |
| JP | 10-334877 | 12/1998 |
| JP | 2002-008724 | 1/2002 |
| JP | 2003-022707 | 1/2003 |
| KR | 1019880011946 | 10/1988 |
| KR | 1020000059999 | 10/2000 |
| KR | 1020000061755 | 10/2000 |
| KR | 10-2001-0080496 A | 8/2001 |
| KR | 1020020006387 | 1/2002 |
| KR | 1020030089750 | 11/2003 |
| RU | 2218634 C2 | 12/2003 |
| WO | WO-98/38688 A1 | 9/1998 |
| WO | 0031812 | 6/2000 |
| WO | WO 00/38263 | 6/2000 |
| WO | WO 02/092638 | 11/2002 |

OTHER PUBLICATIONS

Chung et al., "Enhancement of ion transport in polymer electrolytes by addition of nanoscale inorganic oxides," Journal of Power Sources, vol. 97-98, 2001, pp. 644-648.

Zhang et al., "Characteristics of lithium-ion-conducting composite polymer-glass secondary cell electrolytes," Journal of Power Sources, vol. 112, 2002, pp. 209-215.

Korean Intellectual Property Office, PCT International Search Report, Date of Mailing: May 24, 2005.

"Inorganic-Organic Composite Solid Polymer Electrolytes," Abraham, K.M.; Koch, V.R.; Blakley, T.J. Journal of the Electrochemical Society, 2000, vol. 147, No. 4, pp. 1251-1256.

Four volts class solid lithium polymer batteries with a composite polymer electrolyte, Li, Q.; Imanishi, N.; Takeda, Y.; Yamamoto, O. Journal of Power Sources, 2002, vol. 110, No. 1, pp. 38-45.

A novel intrinsically poous separator for self-standing lithium-ion batteries, Prosini, P.P.; Villano, P.; Carewska, M. Electrochimica Acta, 2002, vol. 48, No. 3, pp. 227-233.

Characteristics of lithium-ion-conducting composite polymer-glass secondary cell electrolytes, Zhang, X.W.; Wang, C.; Appleby, A.J.; Little, F.E. Journal of Power Sources, 2002, vol. 112, No. 1, pp. 209-215.

Ceramic but flexible: new ceramic membrane foils for fuel cells and batteries, Augustin, S.; Hennige, V.; Horpel, G.; Hying, C. Desalination, 2002, vol. 146, pp. 23-28.

"Fabrications and properties of composite solid-state electrolytes," Inada, T.; Takada, K.; Kajiyama, A.; Kouguchi, M.; Sasaki, H.; Kondo, S.; Watanabe, M.; Murayama, M.; Kanno, R. Solid State Ionics 2003, vol. 158, No. 3, pp. 275-280.

"Ionic Conductivities of hybrid inorganic sulfide-polyether electrolytes," Hayashi, A.; Wang, L.; Angell, C.A. Electrochimica Acta, 2003, vol. 48, No. 14, pp. 2003-2008.

"Electrochemical stability and conductivity enhancement of composite polymer electrolytes," Park, C.H.; Kim, D.W.; Prakash, J.; Sun, Y.K. Solid State Ionics, 2003, vol. 159, No. 1, pp. 111-119.

* cited by examiner

Electrode before treatment     Electrode after treatment

○ Electrode active material power
◯ Polymer swellable with electrolyte (encapsulating layer)
o Carbon black (a)     (b)

Ex. 1    Comp. Ex. 1    Ex. 1    Comp. Ex. 1

ORGANIC/INORGANIC COMPOSITE POROUS LAYER-COATED ELECTRODE AND ELECTROCHEMICAL DEVICE COMPRISING THE SAME

This application claims the benefit of the filing dates of Korean Patent Application Nos. 10-2004-0008136, filed on Feb. 7, 2004 and 10-20040008585, filed on Feb. 10, 2004, in the Korean Intellectual Property Office, the disclosures of which are incorporated herein in its entirety by references.

TECHNICAL FIELD

The present invention relates to an electrode that can improve performance and safety of an electrochemical device, more particularly an electrode having a coating layer serving as a substitute for a separator, a method for manufacturing the same, and an electrochemical device comprising the same.

BACKGROUND ART

Recently, there is an increasing interest in energy storage technology. Batteries have been widely used as energy sources in portable phones, camcorders, notebook computers, PCs and electric cars, resulting in intensive research and development into them. In this regard, electrochemical devices are subjects of great interest. Particularly, development of rechargeable secondary batteries is the focus of attention. Recently, research and development into novel electrode and battery that can improve capacity density and specific energy have been made intensively in the field of secondary batteries.

Among currently used secondary batteries, lithium secondary batteries appearing in early 1990's have drive voltage and energy density higher than those of conventional batteries using aqueous electrolytes (such as Ni—MH batteries, Ni—Cd batteries, $H_2SO_4$—Pb batteries, etc). For these reasons, lithium secondary batteries are advantageously used. However, such lithium secondary batteries have disadvantages in that organic electrolytes used therein may cause safety-related problems resulting in ignition and explosion of the batteries and that processes for manufacturing such batteries are complicated.

It is very important to evaluate and secure the battery safety. The most important consideration is that batteries should not cause damages to users upon miss-operation of the batteries. For this purpose, safety of batteries is strictly restricted in terms of ignition and combustion in batteries by safety standards. Therefore, many attempts have been made to solve safety-related problems of batteries.

In order to prevent heat emission from batteries, various methods including use of a protection circuit, use of heat occlusion by a separator, etc., have been suggested. However, use of a protection circuit causes limitation in downsizing and cost reduction of a battery pack. A mechanism of heat occlusion by a separator often acts inefficiently, when heat emission is generated rapidly.

Recently, use of organic electrolyte additives has been also suggested to solve the above-mentioned problem. However, safety mechanisms based on electrolyte additives have disadvantages in that calorific values (J) may be varied depending on charging current or internal resistance of a battery and that timing is not uniform. Additionally, a device for interrupting electric current by using the internal pressure of a battery needs a space inside of a battery for housing it, and thus is not preferred in terms of high capacity. Moreover, the above conventional safety means are always followed by degradation of other battery qualities.

Korean Patent Publication Nos. 0326455, 0326457 and 0374010 disclose methods for coating inorganic particles on a cathode active material. However, such methods have a disadvantage in that they cause degradation in battery performance even if the battery safety may be improved, because the inorganic particles as coating agent have no lithium ion conductivity.

Meanwhile, electrochemical devices such as lithium ion batteries have problems related with currently used separator in addition to the above safety problems. For example, currently available lithium ion batteries and lithium ion polymer batteries use polyolefin-based separators in order to prevent short circuit between a cathode and an anode. However, such polyolefin-based separators have a disadvantage in that they can be shrunk into their original sizes by heating at high temperature due to the properties of the materials for separators such as melting of polyolefin-based materials at 200° C. or less, and processing characteristics such as stretching of the materials for controlling pore sizes and porosity. Therefore, when a battery is heated to high temperature by internal/external factors, there is a great possibility of short-circuit between a cathode and an anode caused by shrinking or melting of separators, resulting in accidents such as explosion of a battery caused by emission of electric energy. As a result, it is necessary to provide a separator that does not cause heat shrinking at high temperature.

To solve the above problems related with polyolefin-based separators, many attempts are made to develop an electrolyte using an inorganic material serving as a substitute for a conventional separator. Such electrolytes may be broadly classified into two types. The first type is a solid composite electrolyte obtained by mixing inorganic particles having no lithium ion conductivity with polymers having lithium ion conductivity. However, it is known that such composite electrolytes serving as a substitute for a conventional separator and liquid electrolyte are not advisable, because such composite electrolytes have low ion conductivity compared to liquid electrolytes, the interfacial resistance between the inorganic materials and the polymer is high while they are mixed, such composite electrolytes cannot be easily handled due to the brittleness thereof when an excessive amount of inorganic materials is introduced, and it is difficult to assemble batteries using such composite electrolytes. See, Japanese Laid-Open Patent No. 2003-022707, ["Solid State Ionics"-vol. 158, n. 3, p. 275, (2003)], ["Journal of Power Sources"-vol. 112, n. 1, p. 209, (2002)], ["Electrochimica Acta"-vol. 48, n. 14, p. 2003, (2003)], etc.

The second type is an electrolyte obtained by mixing inorganic particles with a gel polymer electrolyte formed of a polymer and liquid electrolyte. See, U.S. Pat. No. 6,544,689, Japanese Laid-Open Patent Nos. 2002-008724 and 1993-314995, PCT International Publication Nos. WO02/092638and WO00/038263, ["Journal of Electrochemical Society"-v. 147,p. 1251, (2000)], ["Solid State Ionics"-v. 159, n. 1, p. 111, (2003)], ["Journal of Power Sources"-v. 110, n. 1, p. 38,(2002)], ["Electrochimica Acta"-v. 48, n. 3, p. 227 (2002)], etc. However, the polymer used in such electrolytes has poor binding ability so that a great amount of inorganic materials cannot be used. Therefore, inorganic materials are introduced in a relatively small amount compared to the polymer and liquid electrolyte, and thus merely have a supplementary function to assist in lithium ion conduction made by the liquid electrolyte. Further, such gel type polymer electrolytes have low ion conductivity compared to liquid electrolytes, resulting in degradation of battery performance.

Particularly, most attempts made up to date are for developing an inorganic material-containing composite electrolyte in the form of a free standing film. However, it is practically difficult to apply such electrolyte in batteries due to poor mechanical properties such as high brittleness of the film.

In addition, U.S. Pat. No. 6,432,586 discloses a composite film comprising a polyolefin-based separator coated with silica so as to improve the mechanical properties such as brittleness of an organic/inorganic composite film. However, because such films still use a polyolefin-based separator, they have a disadvantage in that it is not possible to obtain a significant improvement in safety including prevention of heat shrinking at high temperature. Additionally, Creavis Gesellschaft (Germany) has developed an organic/inorganic composite separator comprising a non-woven polyester support coated with silica ($SiO_2$) or alumina ($Al_2O_3$), etc. However, the Creavis's composite separator cannot provide excellent mechanical properties due to the basic characteristics of non-woven webs. Moreover, because the chemical structure of polyester is fragile to electrochemical reactions, the Creavis's composite separator is expected to have many difficulties in practical use in batteries ["Desalination"-vol. 146, p. 23 (2002)].

Accordingly, there is a continuous need for technological research and development into a separator capable of improving performance and safety of an electrochemical device.

BRIEF DESCRIPTION OF THE DRAWINGS

The foregoing and other objects, features and advantages of the present invention will become more apparent from the following detailed description when taken in conjunction with the accompanying drawings in which:

FIGS. 4a and 4b are photographs taken by Scanning Electron Microscope (SEM), each showing the sectional structure of an electrode having a first organic/inorganic composite porous coating layer, wherein FIG. 4a is a photograph of the electrode having a coating layer formed according to the present, and FIG. 4b is a photograph of the electrode having a coating layer formed according to the prior art (plasticizer extraction for coating a gel type polymer electrolyte on an electrode);

DISCLOSURE OF THE INVENTION

Figure 1:
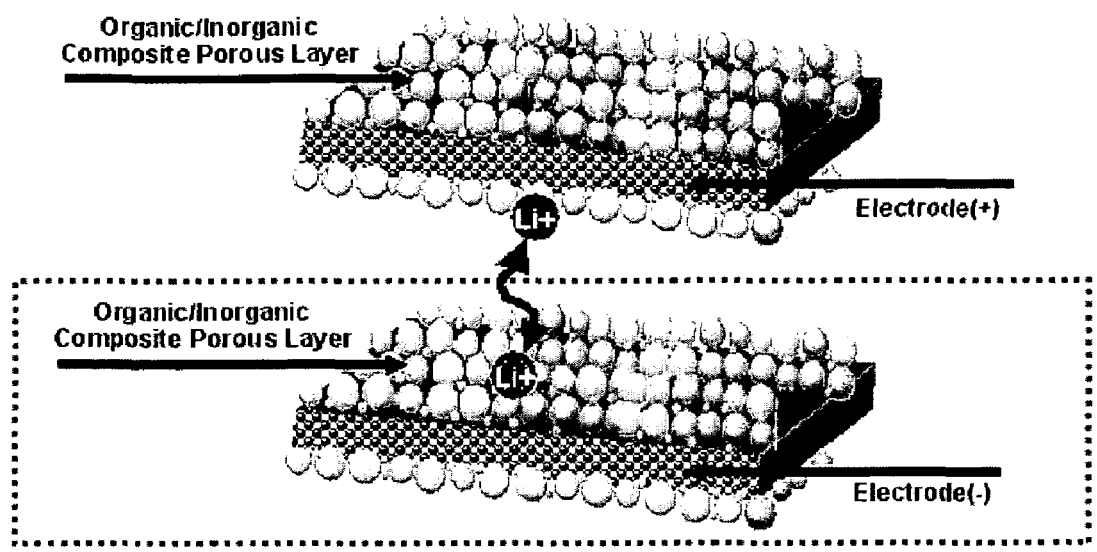
FIG. 1 is a schematic view showing an electrode having a first organic/inorganic composite porous coating layer according to the present invention, when applied in a battery.

We have found that an organic/inorganic composite porous coating layer formed by coating a mixture of inorganic particles with a polymer swellable with a liquid electrolyte directly on the surface of an electrode can substitute for a conventional separator. Further, the above-described organic/inorganic composite porous coating layer is bonded firmly to the interface with an electrode and does not cause heat shrinking, and thus can solve the above problems related with a conventional separator and can improve the performance and safety of an electrochemical device including the electrode coated with the same.

Therefore, it is an object of the present invention to provide an electrode having an organic/inorganic composite porous coating layer capable of improving the performance and safety of an electrochemical device, a method for manufacturing the same and an electrochemical device comprising the same.

According to an aspect of the present invention, there is provided an electrode having a first organic/inorganic composite porous coating layer formed on the surface thereof, wherein the first coating layer comprises inorganic particles and a binder polymer for interconnecting and fixing the inorganic particles, and interstitial volumes among the inorganic particles form micropores. There is also provided an electrochemical device comprising the same electrode.

According to another aspect of the present invention, there is provided a method for manufacturing an electrode having an organic/inorganic composite porous coating layer formed on the surface thereof, which includes the steps of: (a) coating slurry comprising an electrode active material on a current collector and drying it to provide an electrode; and (b) coating a mixture of inorganic particles with a binder polymer on the surface of the electrode obtained from step (a).

Hereinafter, the present invention will be explained in more detail.

The present invention is characterized in that it provides a novel monolithic separator and electrode, which has functions of a separator serving as a spacer for preventing electrical contact between a cathode and an anode and passing ions therethrough as well as functions of an electrode for carrying out reversible lithium intercalation/deintercalation.

The electrode according to the present invention, which is a monolithic separator and electrode, is obtained by coating a mixture of inorganic particles with a binder polymer on the surface of a preformed electrode to form an organic/inorganic composite porous coating layer. The coating layer formed as described above has a uniform porous structure due to interstitial volumes among the inorganic particles in the same manner as a porous structure formed by electrode active material particles in an electrode.

Particular characteristics of the organic/inorganic composite porous coating layer are as follows.

(1) The organic/inorganic composite porous coating layer formed on the electrode according to the present invention can substitute for a conventional separator, because it prevents short circuit between a cathode and an anode and has electrolyte conductivity due to its porous structure.

(2) Conventional polyolefin-based separators cause heat shrinking at high temperature because they have a melting point of 120-140° C. However, The organic/inorganic composite porous coating layer does not cause heat shrinking due to the heat resistance of the inorganic particles. Therefore, an electrochemical device using an electrode having the above coating layer comprising inorganic particles and a binder polymer causes no degradation in safety resulting from an internal short circuit between a cathode and an anode even under extreme conditions such as high temperature, overcharge, etc. As a result, such electrochemical devices have excellent safety characteristics compared to conventional batteries.

(3) Conventional separators or polymeric electrolytes are formed in the shape of free standing films and then assembled together with electrodes. On the contrary, the organic/inorganic composite coating layer is formed by coating it directly on the surface of an electrode so that it can be anchored to pores on the electrode surface, thereby providing a firm physical bonding between the coating layer and the electrode. Therefore, problems related with mechanical properties such as brittleness can be improved. Additionally, such increased interfacial adhesion between the electrode and the coating layer can decrease the interfacial resistance. In fact, the electrode according to the present invention includes the organic/inorganic composite coating layer bonded organically to the electrode active material. Additionally, the coating layer does not affect the pore structure present in the electrode so that the structure can be maintained. Further, the coating layer itself has a uniform pore structure formed by the inorganic particles (see FIGS. 3 and 4).

(4) The organic/inorganic composite porous coating layer has a controllable pore size and porosity depending on the particle diameter of inorganic particles or the mixing ratio of the inorganic particles with the polymer. The pores can be filled with a liquid electrolyte injected subsequently, and thus can significantly reduce the interfacial resistance generated among the inorganic particles or between the inorganic particles and the binder polymer.

(5) When the binder polymer used in the organic/inorganic composite porous coating layer is an electrolyte-functionalized polymer that can be swelled and/or solubilized by a liquid electrolyte, the electrolyte injected after assemblage of a battery can infiltrate into the polymer and the resultant polymer containing the electrolyte infiltrated therein has a capability of conducting electrolyte ions. Therefore, the coating layer according to the present invention can improve the performance of an electrochemical device compared to conventional organic/inorganic composite electrolytes. Additionally, the electrolyte-swellable and/or electrolyte-soluble polymer has excellent affinity to electrolytes, the electrode coated with the same polymer also has increased affinity to electrolytes and thus is expected to improve battery performance. Further, when the polymer is applied to carbonaceous anode active materials, irreversible capacity of an anode can be decreased, thereby providing an increase in the total capacity of a battery.

(6) Although conventional electrodes and separators are used in assembling electrochemical devices according to the prior art, only the electrodes having the organic/inorganic composite porous coating layer capable of substituting for a separator are used according to the present invention. Therefore, processes for manufacturing electrochemical devices can be simplified. Additionally, the coating layer obtained by using a conventional coating process permit the coating thickness to be controlled with ease so that the coating layer can be obtained in the form of a thin film having a thickness of 10 μm or less or in the form of a thick film.

One component present in the organic/inorganic composite porous coating layer formed on the surface of an electrode is an inorganic material in the form of particles currently used in the art. The inorganic particles prevent short circuit between an anode and a cathode so that they can substitute for a separator. Therefore, there is no particular limitation in selection of inorganic particles, as long as they are electrochemically stable. In other words, there is no particular limitation in inorganic particles that may be used in the present invention, as long as they are not subjected to oxidation and/or reduction at the range of drive voltages (for example, 0-5 V based on $Li/Li^+$) of a battery to which they are applied. Particularly, it is preferable to use inorganic particles having ion conductivity as high as possible, because such inorganic particles can improve ion conductivity and performance in an electrochemical device. Additionally, when inorganic particles having high density are used, they have a difficulty in dispersion during a coating step and may increase the weight of a battery to be manufactured. Therefore, it is preferable to use inorganic particles having density as low as possible. Further, when inorganic particles having high dielectric constant are used, they can contribute to increase the dissociation degree of an electrolyte salt in a liquid electrolyte, such as a lithium salt, thereby improving the ion conductivity of the electrolyte.

For these reasons, it is preferable to use inorganic particles having a high dielectric constant of 10 or more, inorganic particles having lithium conductivity or mixtures thereof.

Particular non-limiting examples of inorganic particles having a dielectric constant of 10 or more include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$ or mixtures thereof.

As used herein, "inorganic particles having lithium ion conductivity" are referred to as inorganic particles containing lithium elements and having a capability of conducting lithium ions without storing lithium. Inorganic particles having lithium ion conductivity can conduct and move lithium ions due to defects present in their structure, and thus can improve lithium ion conductivity and contribute to improve battery performance. Non-limiting examples of such inorganic particles having lithium ion conductivity include: lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_x$-$P_yS_z$, $0<x<3$, $0<y<3$, $0<z<7$) such as $LiI$—$Li_2S$—$P_2S_5$, or mixtures thereof.

According to the present invention, inorganic particles having relatively high dielectric constant are used instead of inorganic particles having no reactivity or having relatively low dielectric constant. Further, the present invention also provides a novel use of inorganic particles which have never been used. The above-described inorganic particles, for example $Pb(Zr,Ti)O_3$ (PZT), $Pb_{1-x}La_xZr_{1-y}Ti_yO_3$ (PLZT), PB ($Mg_3Nb_{2/3}$)$O_3$—$PbTiO_3$ (PMN-PT), hafnia ($HfO_2$), etc., has a high dielectric constant of 100 or more. The inorganic particles also have piezoelectricity so that an electric potential can be generated between both surfaces by the charge formation, when they are drawn or compressed under the application of a certain pressure. Therefore, the inorganic particles can prevent internal short circuit between both electrodes, thereby contributing to improve the safety of a battery. Additionally, when such inorganic particles having high dielectric constant are combined with inorganic particles having lithium ion conductivity, synergic effects can be obtained.

Although there is no particular limitation in size of inorganic particles, inorganic particles preferably have a size of 0.001-10 μm for the purpose of forming a coating layer having a uniform thickness and providing a suitable porosity. When the size is less than 0.001 μm, inorganic particles have poor dispersibility so that physical properties of the organic/inorganic composite porous coating layer cannot be controlled with ease. When the size is greater than 10 μm, the resultant organic/inorganic composite porous coating layer has an increased thickness under the same solid content, resulting in degradation in mechanical properties. Furthermore, such excessively large pores may increase a possibility of internal short circuit being generated during repeated charge/discharge cycles.

Another component present in the organic/inorganic composite porous coating layer formed on the surface of an electrode is a binder polymer currently used in the art. The binder polymer preferably has a glass transition temperature (Tg) as low as possible, more preferably Tg of between –200° C. and 200° C. Binder polymers having a low Tg as described above are preferable, because they can improve mechanical properties such as flexibility and elasticity of a final coating layer. The polymer serves as a binder that interconnects and stably fixes the inorganic particles among themselves, between the inorganic particles and the surface of an electrode active material, and a part of pores in an electrode, and thus prevents degradation in mechanical properties of a finally formed electrode.

It is not essential to use a binder polymer having ion conductivity. However, when the binder polymer has ion conductivity, it can further improve the performance of an electrochemical device. Therefore, the binder polymer preferably has a dielectric constant as high as possible. Because the dissociation degree of a salt in an electrolyte depends on the dielectric constant of a solvent used in the electrolyte, the polymer having a higher dielectric constant can increase the dissociation degree of a salt in the electrolyte used in the present invention. The dielectric constant of the polymer may range from 1.0 to 100 (as measured at a frequency of 1 kHz), and is preferably 10 or more.

According to the present invention, the binder polymer may be a soluble or swellable polymer, or a polymer having mixed properties, depending on the kind of liquid electrolyte to be used. The electrolyte-swellable polymer may absorb the electrolyte injected after assemblage of a battery to be provided with electrolyte ion conductivity, thereby improving battery performance. Additionally, an electrolyte-soluble polymer is slightly dissolved by a liquid electrolyte injected after assemblage of a battery to form a high-viscosity electrolyte, and thus can inhibit side reactions between an electrode active material and electrolyte, thereby improving battery safety. Particularly, it is preferable to use an electrolyte-soluble polymer mixed with electrolyte-swellable polymer having excellent affinity to electrolytes. When such electrolyte-functionalized binder polymers that can be swelled and/or solubilized with a liquid electrolyte are used in the form of a mixture, the above-described effects are synergically combined to improve battery safety as well as to prevent degradation in battery performance.

Further, hydrophilic polymers having a number of polar groups are more advisable as a binder polymer compared to hydrophobic polymers such as polyolefin polymers. Therefore, polymers that may be used in the present invention preferably have a solubility parameter of 17.0 $[J^{1/2}/cm^{3/2}]$ or more, more preferably of between 17.0 and 30 $[J^{1/2}/cm^{3/2}]$. When the solubility parameter of a polymer is 17 $[J^{1/2}/cm^{3/2}]$ or less, the polymer cannot be swelled sufficiently in a conventional electrolyte for a battery.

In addition to the above functions, the binder polymer according to the present invention may be further characterized in that it is gelled when swelled with a liquid electrolyte, and thus shows a high degree of swelling. Therefore, such polymers are preferably used in an amount of at least 1 wt %, more preferably of between 1 and 1,000 wt % based on the total weight of polymers.

Non-limiting examples of the binder polymer that may be used in the present invention include polyethylene oxide, polyvinylidene fluoride, polyvinylidene fluoride-hexafluoropropylene, polyvinylidene fluoride-trichloroethylene, polymethylmethacrylate, polyacrylonitrile, polyacrylonitrile-styrene copolymer, polyvinyl chloride (PVC), polyvinylpyrrolidone, polyvinyl acetate, polyethylene-vinyl acetate copolymer, gelatin, cyanoethylpullulan, cyanoethyl polyvinylalcohol, cyanoethylcellulose, cyanoethylsucrose, pullulan, cellulose acetate, cellulose acetate butyrate, cellulose acetate propionate, polyethylene glycol, glyme, polyethylene glycol dimethylether, carboxymetyl cellulose or mixtures thereof.

There is no particular limitation in mixing ratio of inorganic particles to polymer in the organic/inorganic composite porous coating layer according to the present invention. The mixing ratio can be controlled according to the thickness and structure of a coating layer to be formed finally. More particularly, the mixing ratio of inorganic particles to polymer preferably ranges from 10:90 to 99:1 on the weight percent basis, more preferably ranges from 50:50 to 99:1. When the mixing ratio is less than 10:90, the polymer may be present in such an excessively large amount as to cause a decrease in interstitial volumes formed among inorganic particles, thereby reducing the pore size and porosity of a coating layer, resulting in degradation in battery performance. When the mixing ratio is greater than 99:1, the amount of polymer is excessively low to cause the adhesion among inorganic particles to be weakened, resulting in degradation in mechanical properties of a resultant organic/inorganic composite porous coating layer.

There is no particular limitation in thickness of the organic/inorganic composite porous coating layer formed by coating a mixture of inorganic particles with a binder polymer. The thickness may be controlled depending on the performance of a battery. The thickness of each coating layer formed on a cathode and an anode may be controlled independently.

According to the present invention, the coating layer preferably has a thickness of between 1 and 100 μm, more preferably of between 1 and 30 μm, for the purpose of decreasing the internal resistance in a battery.

Additionally, the pore size and porosity of the organic/inorganic composite porous coating layer mainly depend on the size of inorganic particles. For example, when inorganic particles having a particle diameter of 1 μm or less are used, pores formed thereby also have a size of 1 μm or less. The pore structure is filled with an electrolyte injected subsequently and the electrolyte serves to conduct ions. Therefore, the pore size and porosity are important factors in controlling the ion conductivity of a coating layer. Preferably, the pores size and porosity of the organic/inorganic composite porous coating layer according to the present invention range from 0.001 to 10 μm and from 10 to 95%, respectively.

The organic/inorganic composite porous coating layer formed on an electrode according to the present invention may further comprise other additives.

In another embodiment of the electrode having the organic/inorganic composite porous coating layer capable of substituting for a separator, the electrode optionally further comprises a second coating layer formed by coating the surface of electrode active materials forming the electrode partially or totally with a polymer.

The second polymeric coating layer is obtained by coating the surface of electrode active materials in the electrode manufactured by a conventional method with a polymer, preferably with an electrolyte-functionalized polymer that can be swelled and/or solubilized with an electrolyte. When the surface is coated with a solution containing a polymer that can be swelled and/or solubilized with an electrolyte, the solution can infiltrate into the inside of the electrode through the pores of the electrode itself. Therefore, it is possible to coat the active material present inside of the electrode uniformly with the polymer while maintaining the fundamental structure of the electrode. Additionally, because the pore structure among electrode active material particles is maintained, the electrolyte can infiltrate into the electrode promptly, while the resultant polymeric thin film having a thickness of 1 μm or less can minimize a drop in moving rate of lithium ions.

Hereinafter, the above-mentioned second polymeric coating layer will be explained in more detail.

(1) The second polymeric coating layer formed on the surface of electrode active materials in an electrode according to the present invention can improve the safety of an electrochemical device. More particularly, conventional electrode active materials may react with a highly reactive electrolyte when they are unstabilized due to external impacts such as overcharge and high-temperature storage. However, according to the present invention, the surface of active materials in an electrode is surrounded with a polymer, preferably with a polymer that can be swelled and/or solubilized with a liquid electrolyte. Therefore, after an electrochemical device is assembled and then a conventional electrolyte is injected thereto, the electrode active material is not directly contacted with the electrolyte but is contacted with the polymer so that the reactivity of the electrode active material may be significantly decreased. As a result, the calorific value caused by side reactions between the electrode and electrolyte can be decreased, and thus the safety of electrochemical device can be significantly improved.

(2) The second polymeric coating layer formed on the surface of electrode active materials in an electrode according to the present invention can minimize degradation in performance of an electrochemical device.

According to the present invention, an electrode is manufactured first and then the electrode surface is coated with a polymer. On the contrary, according to the prior art, an electrode active material is coated with a conductive polymer or inorganic particles before the manufacture of an electrode, and then an electrode is formed by using the electrode active material coated as described above. Therefore, according to the present invention, aggregation of electrode active materials or separation of the polymer coated on the active material does not occur. Additionally, because the distribution and structure among constituents of an electrode can be substantially maintained, basic properties such as capacity or performance of an electrochemical device can also be maintained.

(3) The polymer used in the second polymeric coating layer according to the present invention can be swelled and/or solubilized with a liquid electrolyte. As described above, when an electrolyte is injected into a battery during the manufacture thereof, the polymer can have electrolyte ion conductivity, thereby minimizing degradation in battery performance.

(4) Since the polymer that can be swelled and/or solubilized with a liquid electrolyte has excellent affinity to the electrolyte, the electrode coated with the polymer also has improved wettability with the electrolyte. Therefore, it is possible to reduce the irreversible capacity at an anode, and thus to obtain increased total capacity.

(5) According to the prior art, a separator as well as an electrode may be coated with a polymer. However, such separators coated with a polymer may serve as a resistant layer against lithium ion conduction, and thus have a problem of degradation in battery performance such as ion conductivity. On the contrary, according to the present invention, the polymer that can be swelled and/or solubilized with a liquid electrolyte is present only on the surface of an electrode active material. Therefore, there is no problem related with degradation in battery performance caused by the presence of a polymer on a separator.

There is no particular limitation in selection of polymers that may be used in the second polymeric coating layer formed on the surface of electrode active material particles interconnected in an electrode. It is preferable to use polymers having physical properties similar to those of the binder polymer in the first organic/inorganic composite porous coating layer. Any materials may be used alone or as a mixture, as long as they have the above-mentioned properties.

The electrode active material particles coated with the polymer of the second coating layer have to maintain the pore structure among interconnected active material particles. It is preferable that the polymeric coating layer is not mixed with a binder optionally used in slurry for conventional electrodes but is present as an independent phase.

Although the polymer of the second polymeric coating layer may be used in such a volumetric amount that pores in an electrode are totally filled with the polymer, the amount may be controlled considering the relationship between the performance and safety of a battery. Additionally, polymer may be used in an amount controlled independently at a cathode and an anode. The polymer in the second polymeric coating layer is present in an electrode in an amount of at least 0.01 wt %, preferably of between 0.01 and 50 wt %, based on the weight of electrode active materials.

The second polymeric coating layer coated, as an independent phase, on the surface of electrode active material particles interconnected in an electrode has a thickness preferably of between 0.001 μm (1 nm) and 10 μm and more preferably of between 10 nm and 100 nm. When the thickness is less than 1 nm, it is not possible to efficiently prevent side reactions and exothermic reactions between the electrode active material and electrolyte predominantly occurring under overcharging or high-temperature storage conditions. Therefore, it is not possible to improve the safety of a battery. When the thickness is more than 10 μm, it takes a long time for the polymer to be swelled or solubilized by infiltration of electrolyte and lithium ion conductivity reduces, thereby degrading the overall performance of a battery.

The electrode including the second polymeric coating layer coated on the surface of electrode active material as an independent phase has reduced porosity compared to the electrode not including the second coating layer. The porosity of the electrode including the second coating layer is preferably controlled in the range of between 1% and 50%. Pores of an electrode are the portions to be filled with an electrolyte. When the porosity of the electrode is less than 1%, the ratio of electrolyte (E) to electrode active material (M), i.e. E/M is too low, thereby detracting from battery performance due to insufficient lithium ion conduction. When the porosity of the electrode is more than 50%, side reactions between the electrolyte and electrode active material progress excessively under overcharging or high-temperature storage conditions, thereby detracting from battery safety.

Additionally, the polymer of the second coating layer has high affinity to an electrolyte, as described above, and thus the electrode including the second coating layer also has high affinity to an electrolyte. Therefore, the contact angle between the electrode including the second coating layer and the electrolyte decreases, preferably by 1° or more, compared to the electrode not including the second coating layer.

Preferably, the electrode according to the present invention has a structure including the second polymeric coating layer formed on the surface of interconnected electrode active material particles, and the first organic/inorganic composite porous coating layer capable of substituting for a separator formed on the electrode surface. Therefore, it is possible to improve the safety and performance of a battery synergically.

Coating a mixture of inorganic particles with a binder polymer on the surface of an electrode may be performed by a conventional process well known to one skilled in the art.

One embodiment of a method for manufacturing an electrode according to the present invention, includes the steps of: (a) applying slurry comprising an electrode active material optionally with a binder and/or conductive agent on a current collector by using a conventional method to provide an electrode; (b) dissolving a binder polymer in an appropriate organic solvent to provide a binder polymer solution, adding inorganic particles to the solution and mixing them, and coating the electrode obtained in step (a) with the mixture and then drying the coated electrode.

It is preferable that the solvent has a solubility parameter similar to that of the polymer to be used and a low boiling point. Such solvents can be mixed uniformly with the polymer and can be removed easily after coating the polymer. Solvents that may be used include acetone, tetrahydrofuran, methylene chloride, chloroform, dimethylformamide, N-methyl-2-pyrrolidone (NMP), cyclohexane, water and mixtures thereof, but are not limited thereto.

Additionally, it is preferable to perform a step of pulverizing inorganic particles after adding the inorganic particles to the binder polymer solution. The time needed for pulverization is suitably 1-20 hours. The particle size of the pulverized particles ranges preferably from 0.01 and 10 μm. Conventional pulverization methods, preferably a method using a ball mill may be used.

In order to coat the preformed electrode with the mixture of inorganic particles with binder polymer, any methods known to one skilled in the art may be used. It is possible to use various processes including dip coating, die coating, roll coating, comma coating or combinations thereof,.

Figure 3:
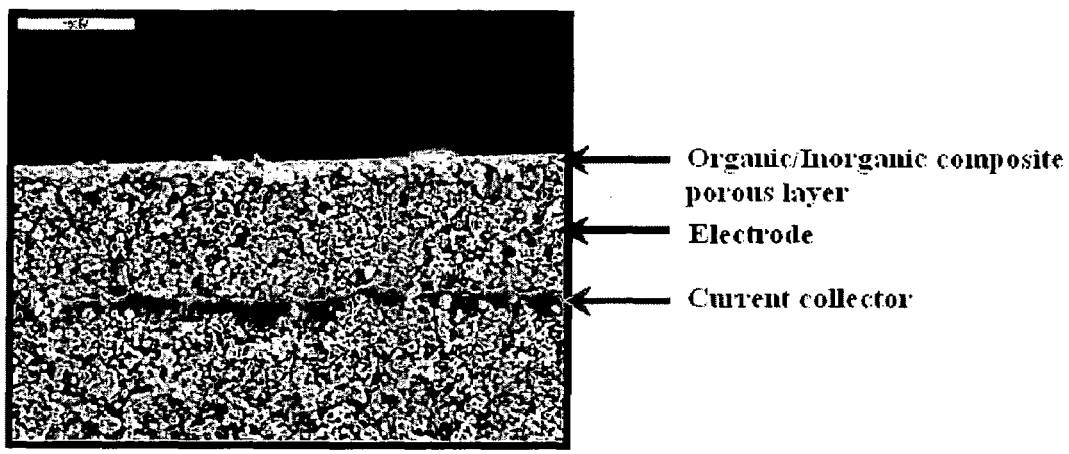
FIG. 3 is a photograph taken by Scanning Electron Microscope (SEM) showing the sectional structure of an electrode having a first organic/inorganic composite porous coating layer according to the present invention.
Figure 4:
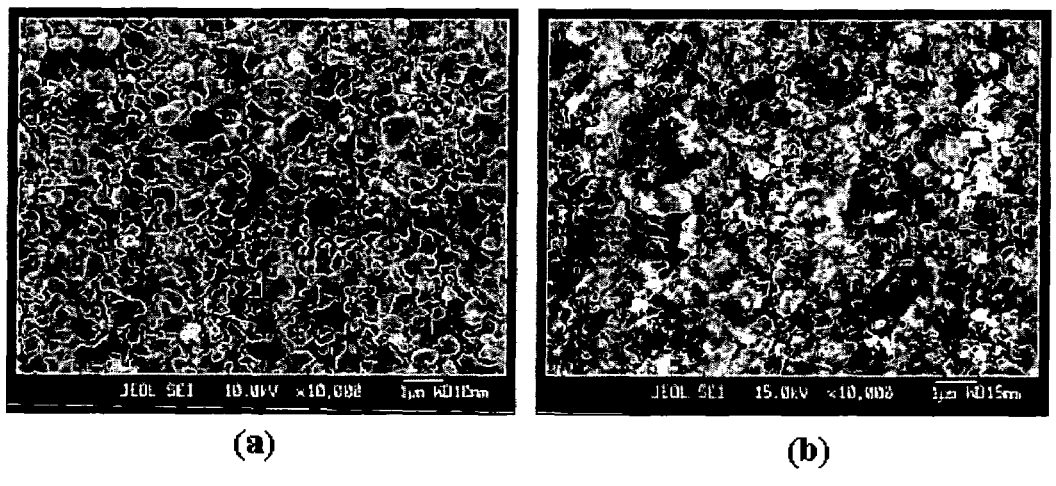

Conventional electrodes coated with gel-type polymer electrolyte to which inorganic particles are added may form porous structures by adding and extracting a plasticizer intentionally (see, FIG. 4b). However, in this case, the pores have a pore size of several angstroms (Å) and low porosity. Therefore, batteries using such conventional electrodes show poor performance. On the contrary, the electrode prepared as described above has a structure wherein the electrode active material layer and organic/inorganic composite porous coating layer are bonded firmly and organically to each other, while maintaining the pore structure present uniquely in each layer, as shown in FIGS. 3 and 4a. Additionally, the microporous structure present in each layer permits smooth conduction of lithium ions. Therefore, it is expected that degradation in battery performance can be minimized (see, FIG. 1).

In another embodiment of the method for manufacturing an electrode according to the present invention, a polymer is coated on the surface of electrode active material particles to form a second coating layer. The second coating layer is formed by coating the surface of electrode active material particles with the polymer for the second coating layer in additional step (c), between step (a) and step (b).

Figure 2:
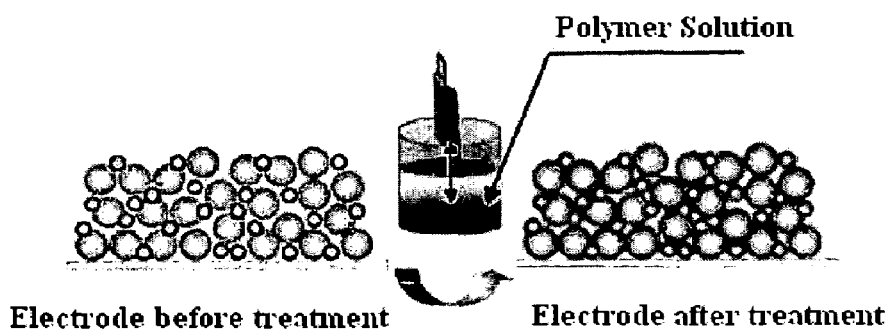
FIG. 2 is a schematic view showing a step for forming a second coating layer on the surface of an electrode active material in the manufacturing process of an electrode according to the present invention.

For example, in step (c), the polymer for the second coating layer is dissolved in an appropriate solvent to provide a polymer solution and then a preformed electrode is dipped into the solution, as shown in FIG. 2. Otherwise, the polymer for the second coating layer may be added and mixed with conventional slurry for electrodes.

When the polymer for the second coating layer is dissolved in a solvent, the content of polymer in the solvent should be controlled so that it is not higher than such concentration as to completely fill the pores in the electrode surface. When the polymer content is excessively high, the viscosity of solution increases, and thus the polymer may not infiltrate into the pores of the electrode but may be present on the electrode surface, thereby forming an additional polymeric layer on the electrode surface. In this circumstance, it is difficult to control the reaction between the electrode and electrolyte. Further, the resultant polymeric layer additionally formed on the electrode surface causes degradation in battery performance. On the other hand, when the polymer content is excessively low, the amount of polymer to be present on the surface of electrode active materials is also low in such a degree that it is insufficient to control the reaction between the electrode and electrolyte. Although the polymer content in solvent may be varied depending on the polymer to be used, the kind of the solvent, the viscosity of the solution and the porosity of the electrode, it is controlled preferably in the range of between 0.1 and 20 wt %.

Further, the present invention provides an electrochemical device comprising a cathode, an anode and an electrolyte, wherein either or both of the electrodes include an organic/inorganic composite porous coating layer comprising inorganic particles and a binder polymer and capable of substituting for a separator, the coating layer being formed on the electrode surface.

Such electrochemical devices include any devices in which electrochemical reactions occur and particular examples thereof include all kinds of primary batteries, secondary batteries, fuel cells, solar cells or capacitors.

In one embodiment of the method for manufacturing an electrochemical device by using the electrode obtained as described above, the electrochemical device is assembled by using the electrode having the coating layer as described above with no need of a conventional polyolefin-based microporous separator, through a winding or stacking process, and then an electrolyte is injected.

The electrode according to the present invention, which is coated with an organic/inorganic composite porous coating layer, may be formed by applying electrode active material on a current collector according to a method known to one skilled in the art. Particularly, cathode active materials may include any conventional cathode active materials currently used in a cathode of a conventional electrochemical device. Particular non-limiting examples of the cathode active material include lithium intercalation materials such as lithium manganese oxides, lithium cobalt oxides, lithium nickel oxides, lithium iron oxides or composite oxides thereof. Additionally, anode active materials may include any conventional anode active materials currently used in an anode of a conventional electrochemical device. Particular non-limiting examples of the anode active material include lithium intercalation materials such as lithium metal, lithium alloys, carbon, petroleum coke, activated carbon, graphite or other carbonaceous materials. Non-limiting examples of a cathode current collector include foil formed of aluminum, nickel or a combination thereof. Non-limiting examples of an anode current collector include foil formed of copper, gold, nickel, copper alloys or a combination thereof.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N- methyl-2-pyrrolidone (NMP), ethylmethyl carbonate (EMC), gamma-butyrolactone (γ-butyrolactone) and mixtures thereof. However, the electrolyte that may be used in the present invention is not limited to the above examples.

More particularly, the electrolyte may be injected in a suitable step during the manufacturing process of an electrochemical device, according to the manufacturing process and desired properties of a final product. In other words, electrolyte may be injected, before an electrochemical device is assembled or in a final step during the assemblage of an electrochemical device.

Further, because the electrode is a monolithic separator and electrode, an additional separator is not essential. However, the electrode coated with a coating layer according to the present invention may be used together with a polyolefin-based microporus separator, depending on the use and properties of a final electrochemical device.

Preferably, the electrochemical device obtained from the above-described method is a lithium secondary battery, wherein the lithium secondary battery includes a lithium metal secondary battery, lithium ion secondary battery, lithium polymer secondary battery, lithium ion polymer secondary battery, etc.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES 1-9

Example 1

Organic/Inorganic Composite Porous Coating Layer-Coated Electrode and Manufacture of Lithium Secondary Battery Comprising the Same 1-1. Electrode Having Organic/Inorganic Composite Porous Coating Layer (PVdF-CTFE/$Al_2O_3$)

(Manufacture of Anode)

To N-methyl-2-pyrrolidone (NMP) as a solvent, 96 wt % of carbon powder as an anode active material, 3 wt % of PVDF (polyvinylidene fluoride) as a binder and 1 wt % of carbon black as a conductive agent were added to form mixed slurry for an anode. The slurry was coated on. Cu foil having a thickness of 10 μm as an anode collector and dried to form an anode. Then, the anode was subjected to roll press.

(Manufacture of Cathode)

To N-methyl-2-pyrrolidone (NMP) as a solvent, 92 wt % of lithium cobalt composite oxide ($LiCoO_2$) as a cathode active material, 4 wt % of carbon black as a conductive agent and 4 wt % of PVDF (polyvinylidene fluoride) as a binder were added to form slurry for a cathode. The slurry was coated on Al foil having a thickness of 20 μm as a cathode collector and dried to form a cathode. Then, the cathode was subjected to roll press.

(Coating of Electrode Surface)

PVdF-CTFE polymer (polyvinylidene fluoride-chlorotrifluoroethylene copolymer) was added to acetone in the amount of about 5 wt % and dissolved therein at 50° C. for about 12 hours or more to form a polymer solution. To the polymer solution obtained as described above, alumina ($Al_2O_3$) powder was added with the concentration of 20 wt %. Then, the alumina powder was pulverized and dispersed for about 12 hours or more by using a ball mill method to form slurry. The particle size of alumina in the slurry can be controlled depending on the size (particle size) of beads used in the ball mill method and ball milling time. In this Example, the alumina was pulverized into a particle size of about 500 nm to provide slurry. Then, the slurry was coated on each surface of the cathode and anode by using a dip coating process to a thickness of about 15 μm.

1-2. Lithium Secondary Battery

The coated cathode and anode obtained as described above were stacked to form an assembly, without using a conventional polyolefin-based separator. Then, a liquid electrolyte (ethylene carbonate (EC)/propylene carbonate (PC)/diethyl carbonate (DEC)=30/20/50 (wt %) containing 1 M of lithium hexafluorophosphate ($LiPF_6$)) was injected thereto to provide a battery.

Example 2

Example 1 was repeated to provide an electrode having an organic/inorganic composite porous coating layer (PVdF-CTFE/BaTiO$_3$) and a lithium secondary battery, except that BaTiO$_3$ powder was used instead of alumina (Al$_2$O$_3$) powder, as inorganic particles in the coating material on the electrode surface.

Example 3

Example 1 was repeated to provide an electrode having an organic/inorganic composite porous coating layer (PVdF-CTFE/PMN-PT) and a lithium secondary battery, except that PMN-PT(lead magnesium niobate-lead titanate) powder was used instead of alumina (Al$_2$O$_3$) powder, as inorganic particles in the coating material on the electrode surface.

Example 4

Example 1 was repeated to provide an electrode having an organic/inorganic composite porous coating layer (PVdF-CTFE/TiO$_2$) and a lithium secondary battery, except that TiO$_2$ powder was used instead of alumina (Al$_2$O$_3$) powder, as inorganic particles in the coating material on the electrode surface.

Example 5

Example 1 was repeated to provide an electrode having an organic/inorganic composite porous coating layer (PVdF-CTFE/LiTi$_2$(PO$_4$)$_3$) and a lithium secondary battery, except that lithium titanium phosphate (LiTi$_2$(PO$_4$)$_3$) powder was used instead of alumina (Al$_2$O$_3$) powder, as inorganic particles in the coating material on the electrode surface.

Example 6

Example 1 was repeated to provide an electrode having an organic/inorganic composite porous coating layer (PVdF-CTFE/Al$_2$O$_3$) and a lithium secondary battery, except that a polyethylene separator having a thickness of 20 μm was also used when assembling a battery.

Example 7

7-1. Formation of Polymeric Coating Layer Comprising Cyanoethylpullulan on Surface of Cathode Active Material Cyanoethyl pullulan (with a degree of polymerization of about 600) was dissolved in acetone for about 1 hour at about 30° C. to provide a solution. The concentration of polymer solution was 1 wt %. The cathode obtained as described the above Example 1-1 was coated with the cyanoethylpullulan solution through a dip coating method. Particularly, the cathode was dipped into the polymer solution and maintained for about 1 to 3 minutes until all bubbles in the pores are evacuated, and then the coated cathode was dried under vacuum at room temperature.

7-2. Formation of Organic/Inorganic Composite Porous Coating Layer (CTFE/Al$_2$O$_3$) on Cathode and Anode CTFE polymer was added to acetone in the amount of about 5 wt % and dissolved at 50° C. for about 12 hours or more to form a polymer solution. To the polymer solution, Al$_2$O$_3$ powder (particle size=300 nm) was added at the solid content of 20 wt % and dispersed therein to provide a mixed solution. The mixed solution was coated on each surface of the cathode and anode obtained as described above through a dip coating method to form a coating layer having a thickness of about 15 μm.

7-3. Assemblage of Lithium Secondary Battery

The coated cathode and anode obtained as described above were stacked to form an assembly. Then, a liquid electrolyte (ethylene carbonate (EC)/propylene carbonate (PC)/diethyl carbonate (DEC)=30/20/50 (wt %) containing 1 M of lithium hexafluorophosphate (LiPF$_6$)) was injected thereto to provide a battery.

Example 8

Example 7 was repeated to provide a battery, except that cyanoethylpolyvinyl alcohol was used instead of cyanoethylpullulan as a polymeric coating agent for the cathode active material and that BaTiO$_3$ (particle size=100 nm) was used instead of Al$_2$O$_3$ as inorganic particles for the organic/inorganic composite porous coating layer on the cathode and anode.

Example 9

Example 7 was repeated to provide a battery, except that polymethyl methacrylate (average molecular weight=120,000) was used instead of cyanoethylpullulan as a polymeric coating agent for the cathode active material and that TiO$_2$ (particle size=100 nm) was used instead of Al$_2$O$_3$ as inorganic particles for the organic/inorganic composite porous coating layer on the cathode and anode.

COMPARATIVE EXAMPLES 1-2

Comparative Example 1

Example 1 was repeated to provide an electrode and battery, except that the electrode was formed with no use of organic/inorganic composite porous coating layer on the electrode and that a conventional three-layer poly propylene/polyethylene/polypropylene (PP/PE/PP) separator was used to manufacture a battery.

Comparative Example 2

Battery Comprising Cathode Coated with Polymeric Coating (Cyanoethylpullulan) Layer, Anode and Polyolefin-Based Separator Example 7 was repeated to provide an electrode and battery, except that cyanoethylpullulan was used to form a polymeric coating layer on the cathode active material, and that a conventional anode and conventional polyolefin-based (PP/PE/PP) separator were used.

Experimental Example 1

Evaluation of Electrode Surface

The following test was performed to analyze the surface of an electrode having an organic/inorganic composite porous coating layer according to the present invention.

The sample used in this test was the electrode having an organic/inorganic composite porous coating layer (Al$_2$O$_3$/PVdF-CTFE) obtained according to Example 1.

When analyzed by using Scanning Electron Microscope (SEM), the electrode according to the present invention showed a structure wherein electrode active material particles and the organic/inorganic composite porous coating layer are anchored to each other (see, FIG. 3). More particularly, in the electrode according to the present invention, the pore structure formed by electrode active material particles was maintained, and the organic/inorganic composite layer formed of inorganic particles and a binder polymer showed a uniform pore structure due to interstitial volumes among the inorganic particles (see, FIGS. 3 and 4a).

Experimental Example 2

Evaluation of Porosity and Shrinkage of Electrode

The electrodes obtained according to the present invention were evaluated for their porosity and shrinkage at high temperature.

The electrodes having an organic/inorganic composite porous coating layer according to Examples 1-6 were used. The separator used in Comparative Example 1 was used as a control.

After the porosity of each electrode and the separator was measured by using a porosimeter, the electrodes having an organic/inorganic composite porous coating layer according to the present invention showed porosity higher than that of a conventional separator (see, Table 1).

Figure 5:
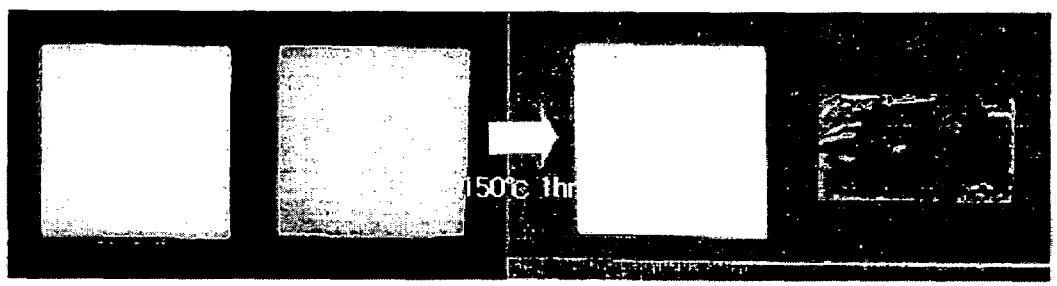
FIG. 5 is a photograph showing the shrinkage of the first organic/inorganic composite porous coating layer according to Example 1 (PVdF-CTFE/$Al_2O_3$) compared to the polyolefin separator according to Comparative Example 1, after both samples are maintained at 150° C. for 1 hour.

Additionally, each of the electrodes having an organic/inorganic composite porous coating layer according to Examples 1 to 6 and the separator according to Comparative Example 1 were checked for its heat shrinkage when stored at a high temperature of 150° C. for 1 hour. The conventional polyolefin-based separator showed a heat shrinkage of about 60% and extremely high heat shrinkage in the direction along which tensile force is applied during the manufacture of the separator (see, FIG. 5). On the other hand, the organic/inorganic composite porous coating layer according to Examples 1 to 6 showed no shrinkage even after the storage at high temperature. Moreover, the coating layer showed a flame resistant property in such a degree that it could not be fired upon heating with an alcohol lamp. This indicates that the organic/inorganic composite porous coating layers according to Examples 1 to 6 have excellent thermal stability (see, Table 1).

TABLE 1

|  | Porosity (%) | Shrinkage (%) (150° C., 1 hr-storage) |
| --- | --- | --- |
| Ex. 1 | 60 | 0 |
| Ex. 2 | 64 | 0 |
| Ex. 3 | 60 | 0 |
| Ex. 4 | 59 | 0 |
| Ex. 5 | 51 | 0 |
| Ex. 6 | 53 | 0 |
| Comp. Ex. 1 | 41 | 60 |

Experimental Example 3

Evaluation for Performance of Lithium Secondary Battery

To evaluate the performance of each lithium secondary battery according to Examples 1 to 6 and Comparative Example 1, capacity and C-rate of each battery were measured.

Each battery having a capacity of 760 mAh was subjected to cycling at a discharge rate of 0.2 C, 0.5 C, 1 C and 2 C. The following Table 2 shows the discharge capacity of each battery, the capacity being expressed on the C-Rate basis.

Figure 6:
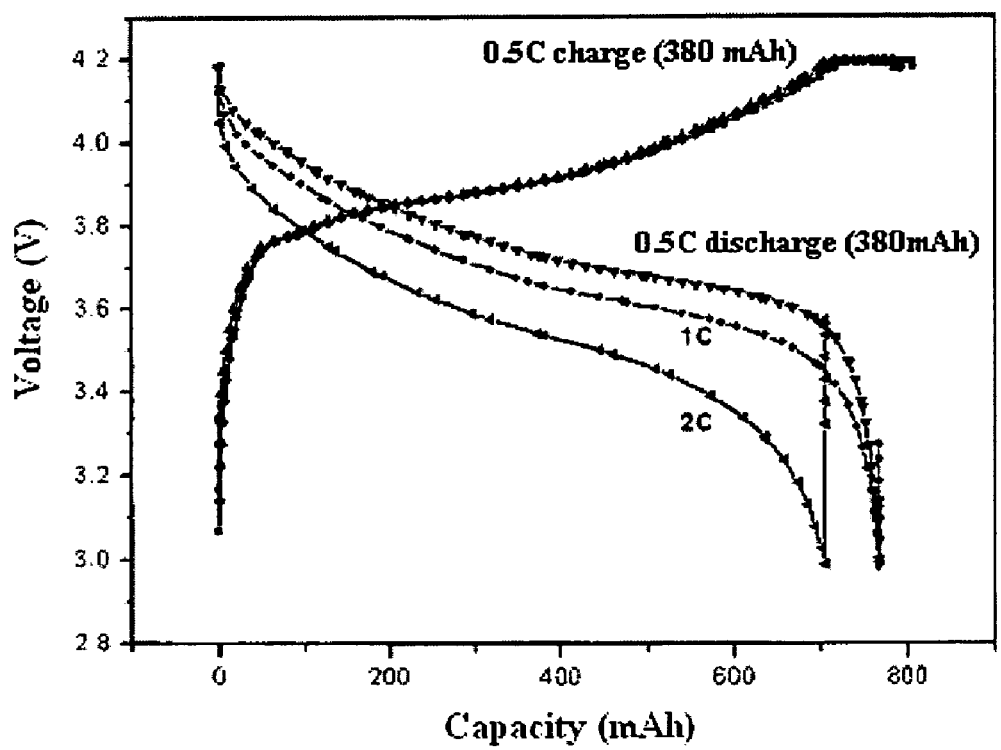
FIG. 6 is a graph showing the charge/discharge characteristics of a lithium secondary battery including the electrode having a first organic/inorganic composite porous coating layer according to Example 1.
Figure 7:
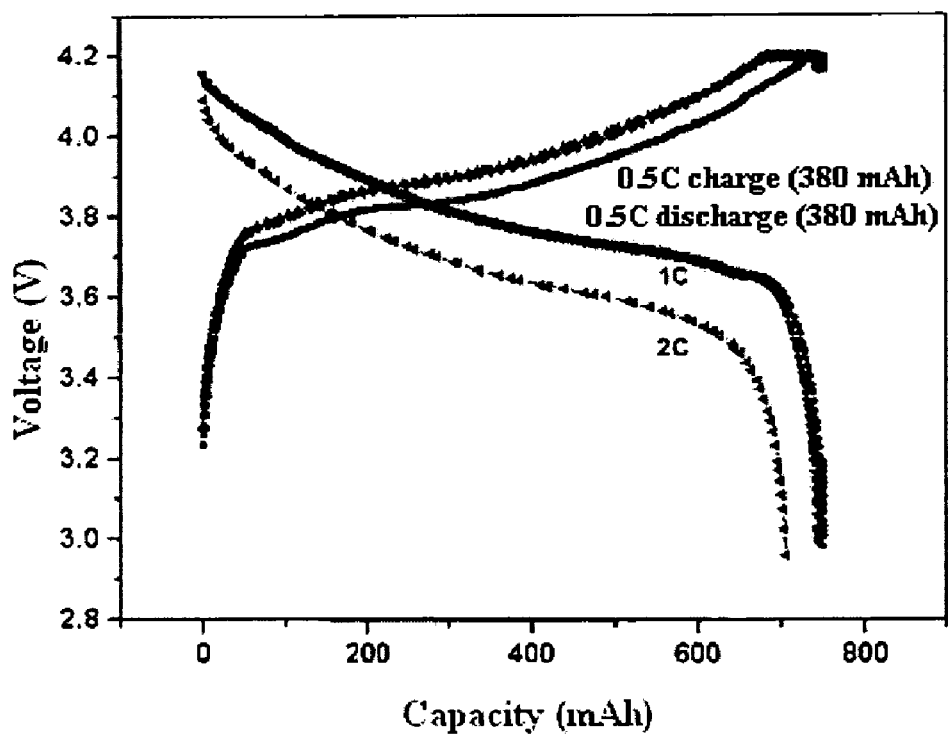
FIG. 7 is a graph showing the charge/discharge characteristics of a lithium secondary battery including the electrode having a first organic/inorganic composite porous coating layer together with a polyolefin-based separator according to Example 6.
Figure 8:
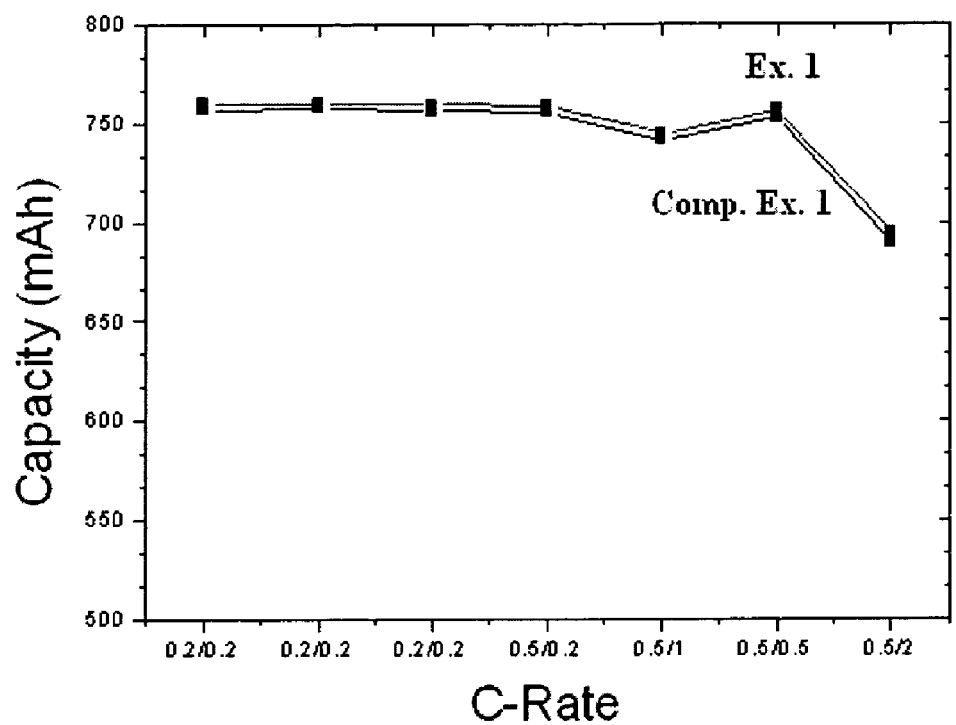
FIG. 8 is a graph showing the high rate discharge characteristics (C-rate) of the lithium secondary batteries according to Example 1 and Comparative Example 1.

Each of lithium secondary batteries according to Examples 1 to 6 shows C-rate characteristics comparable to those of the battery according to Comparative Example 1 [see, Table 2, FIG. 6 (Ex. 1), FIG. 7 (Ex. 6) and FIG. 8 (Ex. 1 and Comp. Ex. 1)]. As shown in Table 2, the capacity at a rate of up to 1 C is equal to the capacity at 0.5 C. The capacity at 2 C also shows excellent high-rate discharge characteristics (C-rate) of 90% or more based on the capacity at 0.5 C.

Figure 9:
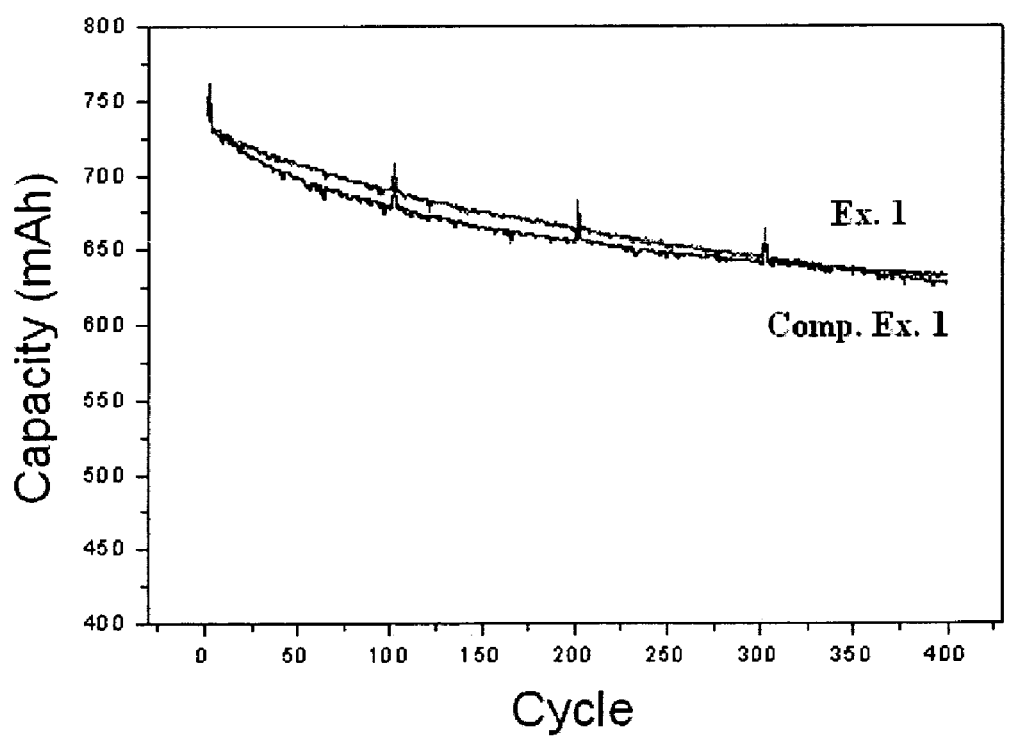
FIG. 9 is a graph showing the cycle characteristics of the lithium secondary batteries according to Example 1 and Comparative Example 1.

Additionally, cycle characteristics of each battery were determined. The lithium secondary battery having an organic/inorganic composite porous coating layer according to Example 1 shows long life characteristic at least equal to that of the battery having a conventional separator according to Comparative Example 1 (see, FIG. 9).

TABLE 2

|  | Ex. 1 | Ex. 2 | Ex. 3 | Ex. 4 | Ex. 5 | Ex. 6 | Comp. Ex. 1 |
| --- | --- | --- | --- | --- | --- | --- | --- |
| 0.2C | 756 | 758 | 757 | 755 | 758 | 755 | 759 |
| 0.5C | 753 | 756 | 756 | 754 | 755 | 755 | 757 |
| 1C | 741 | 740 | 738 | 740 | 739 | 741 | 745 |
| 2C | 689 | 690 | 681 | 688 | 691 | 690 | 695 |

Experimental Example 4

Evaluation for Safety of Lithium Secondary Battery

The following test was performed to evaluate the safety of each lithium secondary battery according to Examples 1 to 9 and Comparative Examples 1 to 2.

4-1. Overcharge Test

Each battery was charged under the conditions of 6V/1 A, 6V/2 A, 10V/1 A and 12V/1 A and then checked.

Figure 10:
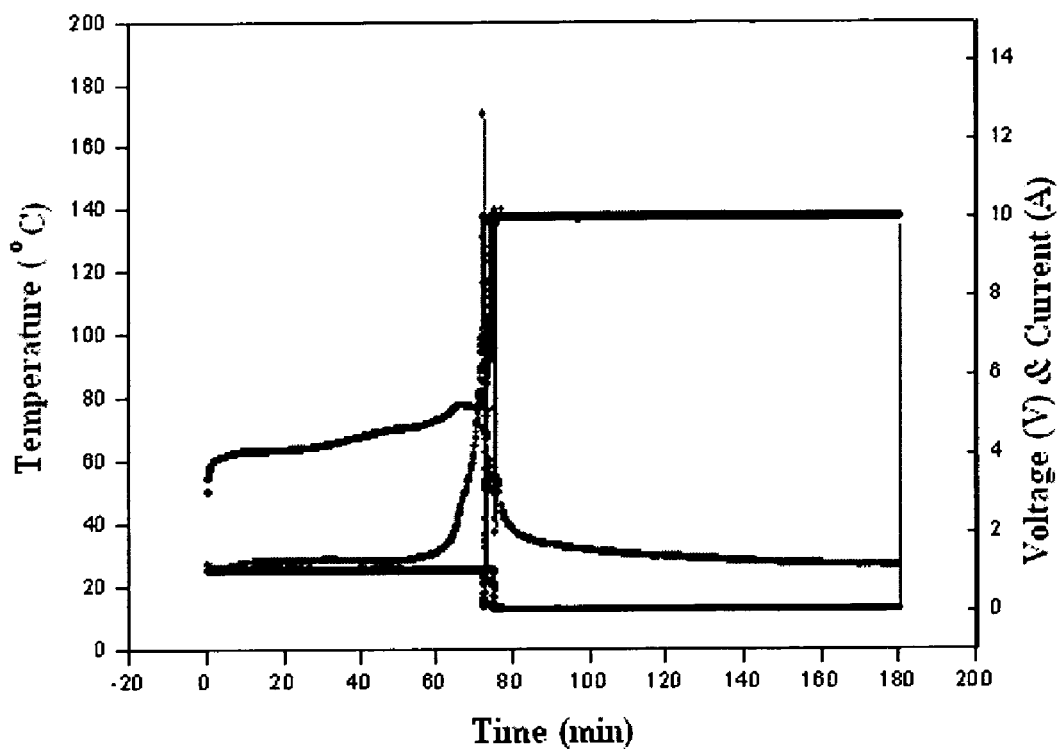
FIG. 10 is a graph showing the results of an overcharge test (10V/1 A) using the lithium secondary battery according to Comparative Example 1.
Figure 11:
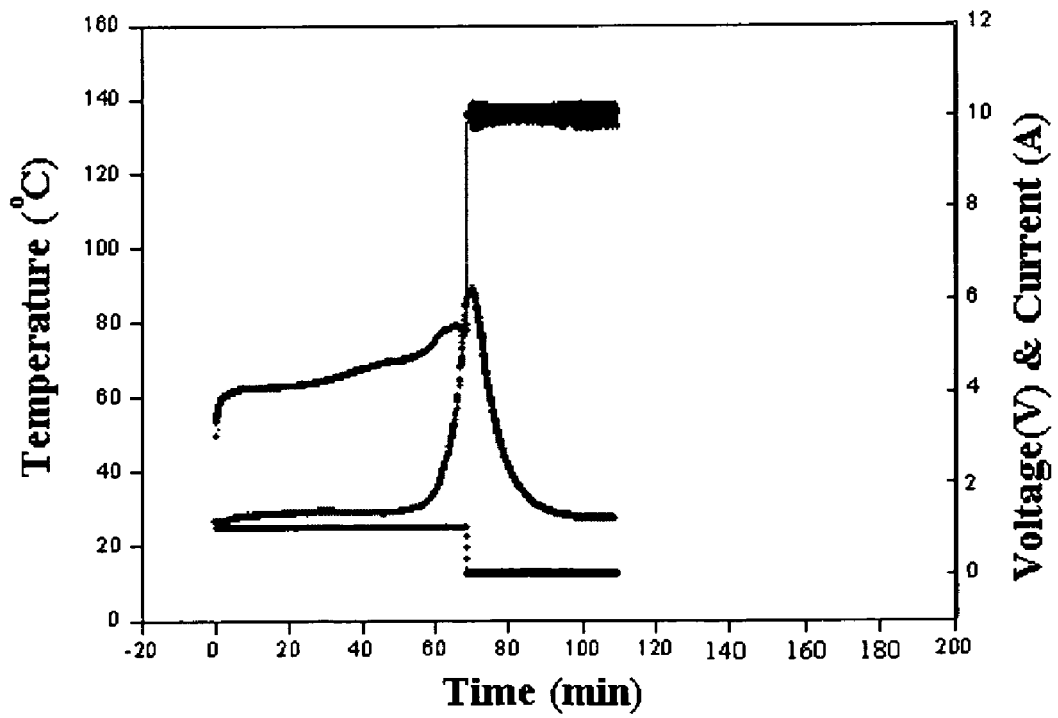
FIG. 11 is a graph showing the results of an overcharge test (10V/1 A) using the lithium secondary battery according to Example 1.
Figure 12:
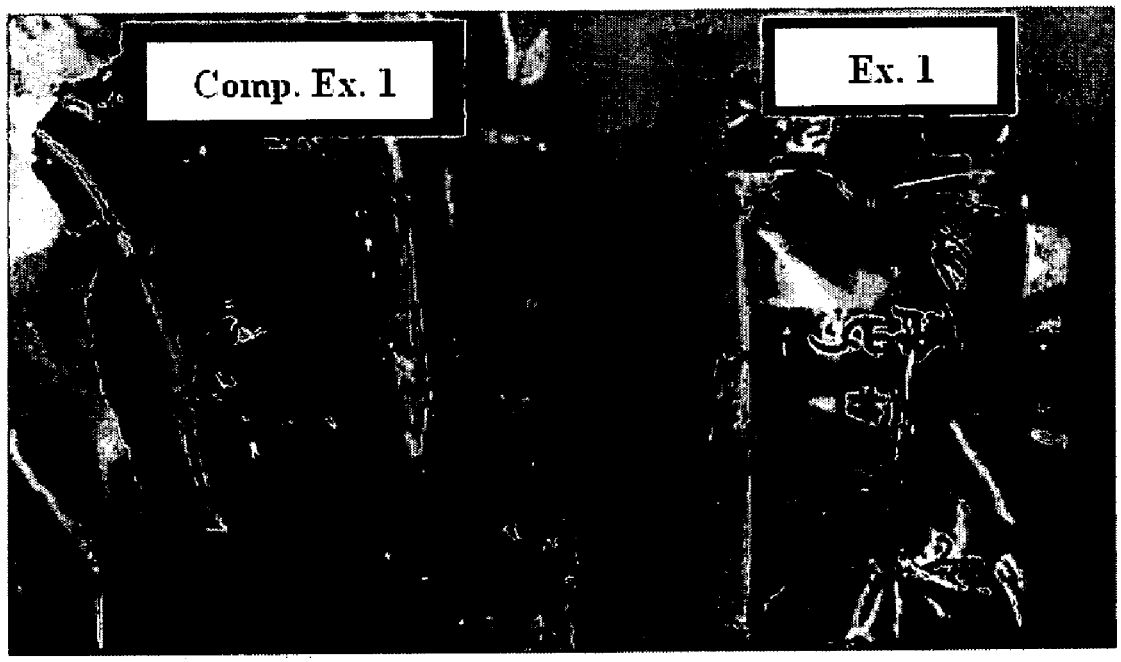
FIG. 12 is a photograph showing the results of an overcharge test (10V/1 A) using the lithium secondary battery according to Example 1 compared to the lithium secondary battery according to Comparative Example 1 tested under the same condition.

After checking, the battery using a currently used PP/PE/PP separator according to Comparative Example 1 exploded (see, Table 3 and FIGS. 10 & 12). This indicates that the polyolefin-based separator is shrunk by overcharge of the battery to cause short circuit between electrodes, resulting in degradation in safety of the battery. On the contrary, each lithium secondary battery having an organic/inorganic composite porous coating layer according to the present invention showed excellent safety upon overcharge (see, Table 3 and FIGS. 11 & 12).

TABLE 3

|  | Overcharge test condition | | | |
| --- | --- | --- | --- | --- |
|  | 6 V/1 A | 6 V/2 A | 10 V/1 A | 12 V/1 A |
| Ex. 1 | pass | pass | pass | pass |
| Ex. 2 | pass | pass | pass | pass |
| Ex. 3 | pass | pass | pass | pass |
| Ex. 4 | pass | pass | pass | pass |
| Ex. 5 | pass | pass | pass | pass |
| Ex. 6 | pass | pass | pass | pass |
| Ex. 7 | pass | pass | pass | pass |
| Ex. 8 | pass | pass | pass | pass |
| Ex. 9 | pass | pass | pass | pass |
| Comp. Ex. 1 | pass | fail | fail | fail |
| Comp. Ex. 2 | pass | pass | pass | fail |

4-2. Hot Box Test

Each battery was stored at high temperatures of 150° C., 160° C. and 170° C. for 1 hour and then checked. The results are shown in the following Table 4.

After storing at high temperatures, each battery obtained from Examples according to the present invention showed such a safe state as to prevent firing and burning, while the battery having a conventional separator according to Comparative Example 1 ignited under the same conditions (see, Table 4).

As a result, the electrode having an organic/inorganic composite porous coating layer according to the present invention can substitute for a conventional separator having poor thermal safety, and thus can improve the safety of a battery.

TABLE 4

|  | Hot Box (° C./1 hr) | | |
| --- | --- | --- | --- |
|  | 150° C. | 160° C. | 170° C. |
| Ex. 1 | pass | pass | pass |
| Ex. 2 | pass | pass | pass |
| Ex. 3 | pass | pass | pass |
| Ex. 4 | pass | pass | pass |
| Ex. 5 | pass | pass | pass |
| Ex. 6 | pass | pass | pass |
| Ex. 7 | pass | pass | pass |
| Ex. 8 | pass | pass | pass |
| Ex. 9 | pass | pass | pass |
| Comp. Ex. 1 | fail | fail | fail |
| Comp. Ex. 2 | pass | pass | fail |

INDUSTRIAL APPLICABILITY

As can be seen from the foregoing, the organic/inorganic composite porous coating layer formed on electrode surface according to the present invention can substitute for a conventional separator and does not cause heat shrinkage when stored at high temperature. Therefore, the coating layer prevents internal short circuit between a cathode and an anode even when stored at high temperature, thereby improving the safety of an electrochemical device. Additionally, the coating layer according to the present invention has excellent physical properties and ion conductivity, and thus contributes to improve the performance of an electrochemical device.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An electrode comprising:
a first organic/inorganic composite porous coating layer formed directly on a surface of the electrode, said electrode comprising an anode active material or a cathode active material bonded to a current collector, wherein said first organic/inorganic composite porous coating layer comprises:
a mixture of inorganic particles and a binder polymer, wherein
the inorganic particles have a particle diameter of between 0.001 and 10 μm,
the binder polymer has a solubility parameter of between 17.0 and 30 $[J^{1/2}/cm^{3/2}]$,
the inorganic particles are interconnected among themselves and are fixed by the binder polymer,
interstitial volumes among the inorganic particles form a plurality of pores, whose pore size ranges from 0.001 to 10 μm,
the inorganic particles are present in the mixture of inorganic particles with the binder polymer in an amount of 50-99 wt % based on 100 wt % of the mixture,
the electrode having said first organic/inorganic composite porous coating layer in an assembled and functioning electrochemical device and eliminates the need for an independent separator, and
the first organic/inorganic composite porous coating layer has a porosity of between 10 and 95%.

2. The electrode according to claim 1, which further comprises a second polymeric coating layer formed partially or totally on a surface of interconnected electrode active material particles in the electrode.

3. The electrode according to claim 1, wherein the electrode active materials are bonded on a collector while forming a porous structure, and the first organic/inorganic composite porous coating layer and the surface of electrode are anchored to each other.

4. The electrode according to claim 2, wherein the polymer in the second coating layer has a solubility parameter of between 17.0 and 30 $[J^{1/2}/cm^{3/2}]$ depending on an electrolyte to be used.

5. The electrode according to claim 2, wherein each of the binder polymer in the first organic/inorganic composite porous coating layer and the polymer in the second coating layer has a dielectric constant (as measured at a frequency of 1 KHz) of between 1 and 100.

6. The electrode according to claim 2, wherein each of the binder polymer in the first organic/inorganic composite porous coating layer and the polymer in the second coating layer is swelled with a liquid electrolyte at a ratio of between 1 and 1,000% based on the weight of the polymer.

7. The electrode according to claim 2, wherein each of the binder polymer in the first organic/inorganic composite porous coating layer and the polymer in the second coating layer is at least one independently selected from the group consisting of polyethylene oxide, polyvinylidene fluoride, polyvinylidene fluoride-hexafluoropropylene, polyvinylidene fluoride-trichloroethylene, polymethylmethacrylate, polyacrylonitrile, polyacrylonitrile-styrene copolymer, polyvinyl chloride (PVC), polyvinylpyrrolidone, polyvinyl acetate, polyethylene-vinyl acetate copolymer, gelatin, cyanoethylpullulan, cyanoethyl polyvinylalcohol, cyanoethylcellulose, cyanoethylsucrose, pullulan, cellulose acetate, cellulose acetate butyrate, cellulose acetate propionate, polyethylene glycol, glyme, polyethylene glycol dimethylether and carboxymethyl cellulose.

8. The electrode according to claim 2, wherein the second coating layer comprises the polymer in a content of between 0.01 wt % and 50 wt % based on 100 wt % of the electrode active material.

9. The electrode according to claim 2, wherein the polymeric layer forming the second coating layer has a thickness of between 0.001 and 10 μm.

10. The electrode according to claim 1, wherein the inorganic particles are at least one selected from the group consisting of: (a) inorganic particles having a dielectric constant of 10 or more; and (b) inorganic particles having lithium ion conductivity.

11. The electrode according to claim 10, wherein the inorganic particles having a dielectric constant of 10 or more are at least one selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$)$SrTiO_3$, $SnO_2$, $CeO_2$, $MgO$, $NiO$, $CaO$, $ZnO$, $ZrO_2$, $Y_2O_3$, $Al_2O_3$ and $TiO_2$.

12. The electrode according to claim 10, wherein the inorganic particles having lithium ion conductivity are at least one selected from the group consisting of: lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitrides($Li_xN_y$, $0<x<4$, $0<y<2$), $SiS_2$ type glass ($Li_xSi_yS_z$, $0<x<3$, $0<y<2$, $0<z<4$) and $P_2S_5$ type glass ($Li_xP_yS_z$, $0<x<3$, $0<y<3$, $0<z<7$).

13. The electrode according to claim 1, wherein the first organic/inorganic composite porous coating layer has a thickness of between 1 and 100 μm.

14. The electrode according to claim 1, wherein the cathode active material is at least one selected from the group consisting of lithium manganese oxides, lithium cobalt oxides, lithium nickel oxides and lithium iron oxides, and the anode active material is at least one selected from the group consisting of lithium metal, lithium alloys, carbon, petroleum coke, activated carbon, graphite and metal oxides.

15. An electrochemical device comprising a cathode, an anode and an electrolyte, wherein either or both of the cathode and anode are the electrodes as defined in claim 1.

16. The electrochemical device according to claim 15, which is a lithium secondary battery.

17. The electrochemical device according to claim 15, which further comprises a microporous polymeric separator.

18. A method for manufacturing an electrode as defined in claim 1, which comprises the steps of:
(a) coating a current collector with slurry containing an electrode active material and drying it to provide an electrode; and
(b) coating a surface of the electrode obtained from step (a) with a mixture of inorganic particles with a binder polymer.

19. The method according to claim 18, which further comprises step (c) of coating the surface of electrode active material in the electrode obtained from step (a) with a polymer that can be swelled and/or solubilized with the electrolyte, between step (a) and step (b).

20. The method according to claim 19, wherein coating steps (b) and (c) are performed by dissolving or dispersing the polymer that can be swelled and/or solubilized with the electrolyte and the mixture of inorganic particles with a binder polymer, respectively, into a solvent to provide a solution, coating the solution, and then removing the solvent from the solution.

21. An electrochemical device comprising a cathode, an anode and an electrolyte, wherein either or both of the cathode and anode are the electrodes as defined in claim 2.

22. The electrochemical device according to claim 21, which is a lithium secondary battery.

23. The electrochemical device according to claim 21, which further comprises a microporous polymeric separator.

24. A method for manufacturing an electrode as defined in claim 2, which comprises the steps of:
(a) coating a current collector with slurry containing an electrode active material and drying it to provide an electrode; and
(b) coating a surface of the electrode obtained from step (a) with a mixture of inorganic particles with a binder polymer.

25. The method according to claim 24, which further comprises step (c) of coating the surface of electrode active material in the electrode obtained from step (a) with a polymer that can be swelled and/or solubilized with the electrolyte, between step (a) and step (b).

26. The method according to claim 25, wherein coating steps (b) and (c) are performed by dissolving or dispersing the polymer that can be swelled and/or solubilized with the electrolyte and the mixture of inorganic particles with a binder polymer, respectively, into a solvent to provide a solution, coating the solution, and then removing the solvent from the solution.

27. The electrode of claim 1, wherein the mixture of inorganic particles with the binder polymer is a dispersion dissolved or dispersed in an organic solvent.

28. The electrode of claim 1, wherein said binder polymer comprises an electrolyte-soluble polymer mixed with an electrolyte-swellable polymer.

29. The electrode according to claim 1, wherein the inorganic particles are at least one selected from the group consisting of:
(a) inorganic particles having a dielectric constant of 10 or more and being at least one selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$)$SrTiO_3$, $SnO_2$, $CeO_2$, MgO, NiO, CaO, ZnO, $ZrO_2$, $Y_2O_3$ and $TiO_2$; and
(b) inorganic particles having lithium ion conductivity and being at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitrides ($Li_xN_y$, $0<x<4$, $0<y<2$), $SiS_2$ type glass ($Li_xSi_yS_z$, $0<x<3$, $0<y<2$, $0<z<4$) and $P_2S_5$ type glass ($Li_xP_yS_z$, $0<x<3$, $0<y<3$, $0<z<7$).

* * * * *